US012803163B2

(12) United States Patent
Väänänen

(10) Patent No.: US 12,803,163 B2
(45) Date of Patent: Nov. 17, 2026

(54) BISTATIC ANTENNA DEVICE

(71) Applicant: Turck Holding GmbH, Halver (DE)

(72) Inventor: Ismo Väänänen, Espoo (FI)

(73) Assignee: Turck Holding GmbH, Halver (DE)

(*) Notice: Subject to any disclaimer, the term of this patent is extended or adjusted under 35 U.S.C. 154(b) by 38 days.

(21) Appl. No.: 19/040,891

(22) Filed: Jan. 30, 2025

(65) Prior Publication Data

US 2025/0246806 A1 Jul. 31, 2025

(30) Foreign Application Priority Data

Jan. 31, 2024 (EP) .................................... 24155015

(51) Int. Cl.
*H01Q 1/22* (2006.01)
*H01Q 3/24* (2006.01)
*H01Q 3/26* (2006.01)
*H01Q 3/40* (2006.01)
*H04B 7/0426* (2017.01)
*H04B 7/06* (2006.01)

(52) U.S. Cl.
CPC ......... *H01Q 3/2682* (2013.01); *H01Q 1/2208* (2013.01); *H04B 7/043* (2013.01); *H04B 7/06952* (2023.05)

(58) Field of Classification Search
CPC ...... H01Q 1/22; H01Q 1/2208; H01Q 1/2216; H01Q 1/52; H01Q 1/525; H01Q 3/24; H01Q 3/26; H01Q 3/2682; H01Q 3/36; H01Q 3/40; H01Q 25/00; H04B 1/40; H04B 7/04; H04B 7/043; H04B 7/06; H04B 7/0617; H04B 7/06952
See application file for complete search history.

(56) References Cited

U.S. PATENT DOCUMENTS 7,741,965 B2 * 6/2010 Lai ........................... H01Q 9/16 340/505
9,715,609 B1 * 7/2017 Fink ........................ H01Q 25/00
10,530,448 B1 * 1/2020 Tran ..................... H04B 7/0617
11,114,759 B1 * 9/2021 Horn ......................... H01Q 3/40
11,707,387 B2 * 7/2023 Weidman ........... G06K 7/10366 340/573.5
12,425,095 B2 * 9/2025 Farmahini Farahani .................... H04B 7/0691
2010/0025467 A1 2/2010 Leone
(Continued)

FOREIGN PATENT DOCUMENTS

DE 10 2011 083 756 A1 4/2013
EP 3 572 838 A1 11/2019
EP 3 403 580 B1 5/2021

OTHER PUBLICATIONS

European Search Report issued in EP 24 155 015.1, to which this application claims priority, mailed Jul. 9, 2024.

*Primary Examiner* — Tho G Phan
(74) *Attorney, Agent, or Firm* — Pearl Cohen PartGmbB; Raphael Tautz

(57) ABSTRACT

A bistatic antenna device for an RFID reader for industrial applications, comprising a control unit; a transmitter unit; a receiver unit; a transmitting antenna array; and a receiving antenna array; wherein the transmitting antenna array and the receiving antenna array are arranged orthogonally to each other and separate from each other, and wherein the control unit is configured to electrically steer a radiation pattern of the transmitting antenna array and/or the receiving antenna array.

16 Claims, 3 Drawing Sheets

(56) References Cited

U.S. PATENT DOCUMENTS

| | | | |
|---|---|---|---|
| 2013/0343235 | A1 | 12/2013 | Khan |
| 2020/0335867 | A1 | 10/2020 | Choudhury et al. |

* cited by examiner

BISTATIC ANTENNA DEVICE

CROSS REFERENCE TO RELATED APPLICATION

This application claims priority to European patent application 24 155 015.1 filed on Jan. 31, 2024, which is hereby incorporated by reference in its entirety.

TECHNICAL FIELD

The present disclosure relates in general to a bistatic antenna device. The bistatic antenna device may be provided as part of bistatic RFID (Radio Frequency Identification) readers. Such RFID readers may be provided for use cases in logistics, such as in warehouses and/or other logistics sites, e.g. to localize RFID tags.

BACKGROUND

Known scannable antenna arrays are physically large and electrically and/or computationally complex.

In addition, the known antenna arrays and devices require complex hardware components, e.g. such as complex switching matrices and/or expensive SDR/DSP based approaches. For example, there are devices in which the beamforming process is done in a digital domain with a MIMO array.

US 2010/0025467 A1 describes an antenna device using a fixed antenna array without beamforming.

In EP 3 403 580 B1 discloses a reader including a bistatic radio frequency switch matrix which is operable to establish a first antenna of a plurality of antennas as a transmit antenna. However, EP 3 403 580 B1 only describes a mixture of combinations of antenna array arrangements without beamforming.

SUMMARY

A bistatic antenna device for a RFID reader device for industrial applications is provided. The bistatic antenna comprises a control unit; a transmitter unit; a receiver unit; a transmitting antenna array; and a receiving antenna array. The transmitting antenna array and the receiving antenna array are arranged orthogonally to each other and separate from each other. The control unit is configured to electrically steer a radiation pattern of the transmitting antenna array and/or the receiving antenna array.

DETAILED DESCRIPTION

Figure 1:
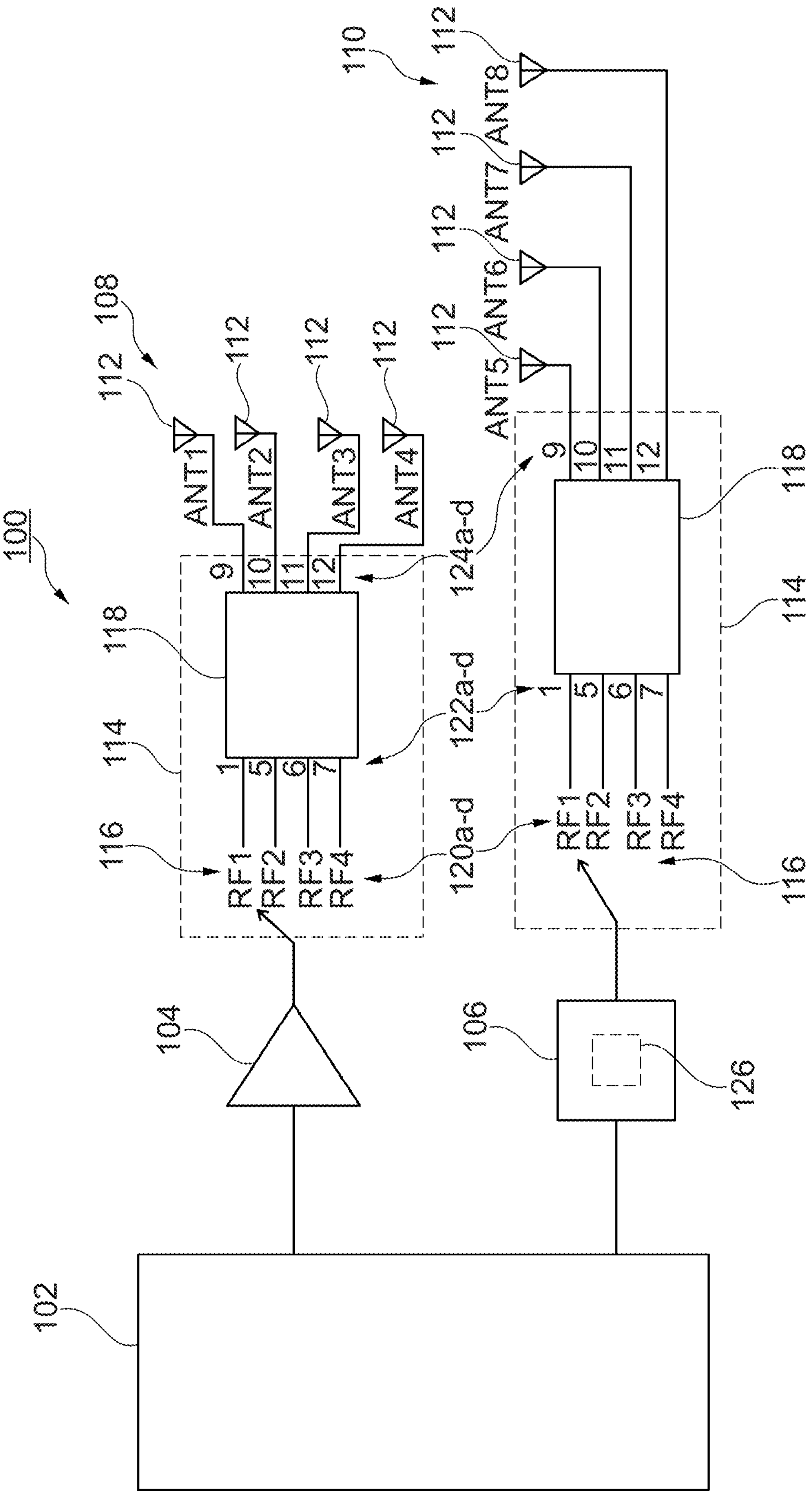
FIG. 1 shows a schematic drawing of general parts of a bistatic antenna device.

In the following, details are set forth to provide a more thorough explanation of the disclosure. However, it will be apparent to those skilled in the art that these implementations may be practiced without these specific details. In other instances, well-known structures and devices are shown in block diagram form or in a schematic view rather than in detail in order to avoid obscuring the disclosure. In addition, features described hereinafter may be combined with each other, even if described with respect to different figures, unless specifically noted otherwise.

Equivalent or like elements or elements with equivalent or like functionality are denoted in the following description with equivalent or like reference numerals. As the same or functionally equivalent elements are given the equivalent or like reference numbers in the figures, a repeated description for elements provided with the equivalent or like reference numbers may be omitted. Hence, descriptions provided for elements having the equivalent or like reference numbers are mutually exchangeable.

Directional terminology, such as "top," "bottom," "below," "above," "front," "behind," "back," "leading," "trailing," etc., may be used with reference to the orientation of the figures being described. Because parts of the disclosure, described herein, can be positioned in a number of different orientations, the directional terminology is used for purposes of illustration and is in no way limiting. It is to be understood that other implementations may be utilized, and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances (e.g., within 5%) that are deemed acceptable in the industry without departing from the aspects of the implementations described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

The bistatic antenna device can comprise a control unit. Optionally, the control unit is configured to control the antenna device.

In general, RFID readers can be monostatic or bistatic. Monostatic systems use the same antenna for both receiving and transmitting purposes. Bistatic systems can use separate antennas for either transmitting or receiving RF energy. Such systems may comprise a bistatic reader having two separate RF channels for transmitting and receiving RF energy (for every port/antenna).

The size of the reader can vary. In one non-limiting example the transmitter and/or receiver can be approximately 300 mm×180 mm×62 mm in size, while the individual arrays can be approximately 600 mm long and 70 mm wide for one four element linear array. The coverage area of the reader may depend on the used array configuration and the used target tags. In one non-limiting example the coverage area may extend up to and including five meters from the transmitting antenna or antenna array. The target localization may depend on the array configuration used, the amount of reflections in the RF environment, the type of tag, and/or distance to the tag. In one non-limiting example, accuracies of or below 1 meter may be achieved.

Furthermore, the bistatic antenna device can comprise a transmitter unit and a receiver unit. The transmitter unit is optionally configured to generate a transmitting signal. The transmitter unit can receive information which can form the basis for the transmitting signal to be generated.

The receiver unit is optionally configured to receive the transmitted and/or a reflected signal. A “reflected signal” can be understood as—but is not limited to—a signal which is generally based on the generated transmitting signal but the signal was reflected and/or effected in a way that the signal—when it is received by the receiver unit—comprises at least one signal parameter which is different compared to the generated transmitting signal. The reflected signal may be the signal sent by an RFID tag to the antenna device, the reflected signal may be generated or correspond to the signal received by the RFID tag from the antenna device.

A “signal parameter” can be—but is not limited to—a phase and/or a frequency of the signal.

The bistatic antenna device can comprise a transmitting antenna array and a receiving antenna array.

The transmitting antenna array is optionally configured to emit the generated transmitting signal of the transmitter unit.

The receiving antenna array is optionally configured to receive the transmitted and/or reflected signal. The receiving antenna array can optionally transfer the received signal to the receiver unit.

The transmitting antenna array and the receiving antenna array can be arranged orthogonally to each other. According to a non-limiting example, the transmitting antenna can be arranged as a vertical antenna array and the receiving antenna array can be arranged as a horizontal antenna array. Vertical/horizontal may be defined as vertical/horizontal with respect to the ground where the antenna device is located. Orthogonal can be defined with respect to a beam pattern emitted by the respective antenna array. Optionally, the two antenna arrays may be considered as being arranged orthogonal to each other if a beam direction of a beam emitted at 0° from the transmitting antenna array is orthogonal to a beam direction of a beam emitted at 0° from the receiving antenna array. The beam direction of a beam emitted at 0° may be orthogonal to an emitting surface of the antenna element emitting said beam. The emitting surface may be the surface of the antenna element via which the beam is emitted (towards the RFID tag).

The transmitting antenna array and the receiving antenna array can be separate from each other. With view to the antenna arrays the term “separate” can be understood as that the two antenna arrays can be controlled separately from each other and/or that the arrays are physically separated from each other only connected to each other via wiring.

Furthermore, the control unit can be configured to electrically steer a radiation pattern of the transmitting antenna array and/or the horizontal antenna array.

This may be beneficial for reducing the physical size and the complexity of the antenna device by establishing the same quality of functionality by using separate antenna devices as well as an electrically steerable radiation pattern.

The bistatic antenna device can be configured as an RFID reader. Optionally, the bistatic antenna device can be a UHF RFID reader.

The control unit can be configured to perform a beamforming by using the transmitting antenna array and/or the receiving antenna array.

Beamforming can be defined as a technique or method for determining a position of a source in a wave field. Beamforming or spatial filtering can include signal processing combining elements in an antenna array in such a way that signals at particular angles experience constructive interference while others experience destructive interference. Beamforming can be used at both the transmitting and receiving ends in order to achieve spatial selectivity.

Optionally, the control unit can be configured to perform a passive beamforming, by using the transmitting antenna array and/or the receiving antenna array.

Optionally, the antenna pattern, especially the radiation pattern, “beam” of the transmitting antenna array can be scanned by the receiving antenna array. Referring back to the example mentioned above, the vertical “beam” can be scanned by the vertical antenna array wide on the horizontal side.

Inversely, the beam of the horizontal receiving antenna array can be optionally scanned in the horizontal space.

The bistatic antenna device, optionally the receiving antenna array or the receiver unit, may “hear” the strongest responses, i.e. receive the strongest reflected signal, from the location where the patterns of the transmitting antenna array and the receiving antenna array intersect.

Optionally, as the beam in the antenna arrays can be electrically scanned, the location of the antenna device can be easily changed. For example, the antenna device can be arranged on a vehicle, e.g. such as a forklift, to localize goods in a warehouse, wherein the goods comprise a RFID tag. However, alternatively the antenna device may be part of fixedly mounted structure. That is, an RFID reader may be provided at a fixed location.

The transmitter unit can be electrically connected to the transmitting antenna array and/or to the receiving antenna array via a beamforming network.

The receiver unit can be electrically connected to the transmitting antenna array and/or to the receiving antenna array via a beamforming network.

Optionally, the transmitter unit and the receiver unit can be connected to the transmitting antenna array and/or the receiving antenna array via the same beamforming network.

The beamforming network can comprise a switching device to select a desired beam.

The beamforming network, optionally the switching device of the beamforming network, can be configured to point a beam in four directions from the boresight of the orthogonally arranged transmitting antenna array and the receiving antenna array.

The beamforming network can optionally comprise a Butler Matrix. Optionally, the beamforming network can be a Butler Matrix.

Optionally, the switching device can be a Butler Matrix.

The term "Butler Matrix" refers to—but is not limited to—a beamforming network used to feed a phased array of antennas or antenna elements. Its purpose can be to control the direction of a beam, or beams, of radio transmission. A Butler Matrix can be defined as (part of) an analog beamforming network that can be used to feed (phased) array antenna elements and control the directions of beams. A Butler Matrix can be used to feed a required phase difference to the antenna elements of a phased array antenna in order to produce beams in a desired direction. The Butler Matrix can have an equal number of input and output ports. Example configurations can be 4×4, 8×8 or N×N, where N is the number of input and output ports. It can be configured to transfer the signal from any of the input ports to any of the output ports with progressive phase shifts. Optionally, the output ports are connected directly to each antenna element of the phased array system. Depending on the activated input port, the signals on the output ports can be phase-shifted such that the beam turns in the desired direction.

The use of a Butler Matrix can be advantageous regarding the control of the radiation pattern of the transmitting antenna array and/or the receiving antenna array.

The transmitting antenna array and the receiving antenna array comprise the same number of antenna elements.

For example, the transmitting antenna array and the receiving antenna array can both comprise four antenna elements. With such a 4×4 array in combination with the orthogonal arrangement and the separate steering of the radiation pattern, the same quality and network parameters can be achieved as with an array of 16 antenna elements (8×8 array).

Furthermore, if an 8×8 array is considered, the benefits of the invention are even more evident. Only two sets of eight antenna elements (8×8 array) are required instead of 64 elements with a common antenna setup. In addition, only two 8×8 beamforming networks (e.g. only or exactly two Butler Matrices) are required instead of 16.

In a non-limiting example, the transmitting antenna array and the receiving antenna array can comprise a different number of antenna elements.

As a non-limiting example, the transmitting antenna array can comprise four antenna elements and the receiving antenna array can comprise eight antenna elements. Such a setup advantageously increases the receiving resolution due to the higher number of antenna elements on the "receiving side".

However, it is also possible that the transmitting antenna array comprises eight antenna elements and the receiving antenna array comprises only four antenna elements.

In general, all combinations of different quantities of antenna elements are possible, depending on the application of the bistatic antenna device and/or the requirements of the bistatic antenna device.

The receiver unit can comprise at least one variable phase shifter.

The variable phase shifter may enhance the function and accuracy of the beamforming network.

In addition, due to the bistatic setup of the antenna device, the receiving antenna array may not be required to withstand the high-power transmitting signal. In an advantageous manner, this allows to implement the at least one variable phase shifter to realize a more compact design of the bistatic antenna device. In addition, the beam pointing resolution may be significantly increased.

With reference to FIG. 1, a schematic drawing of a bistatic antenna device 100 is described. The bistatic antenna device 100 optionally can be configured as an RFID reader and optionally as a UHF RFID reader.

UHF RFID (Radio Frequency Identification) can be defined as a type of RFID system that can be configured to operate in the ultra-high frequency (UHF) band, optionally between 860 MHz and 960 MHz.

The bistatic antenna device 100 (also "antenna device 100" in the following) comprises a control unit 102. In general, the control unit 102 is configured to control the bistatic antenna device 100.

Furthermore, the bistatic antenna device 100 comprises a transmitter unit 104 and a receiver unit 106.

The transmitter unit 104 and the receiver unit 106 are both electrically connected with the control unit 102.

In addition, the antenna device 100 comprises a transmitting antenna array 108 and a receiving antenna array 110. The transmitting antenna array 108 and the receiving antenna array 110 are arranged orthogonally to each other. In FIG. 1, the transmitting antenna array 108 is arranged vertically while the receiving antenna array 110 is arranged horizontally. However, the spatial arrangement of the antenna arrays 108, 110 can change as long as they are arranged orthogonal to each other.

Moreover, the transmitting antenna array 108 and the receiving antenna array 110 are physically separated from each other. Additionally, the two antenna arrays 108, 110 can be controlled separately, optionally independently, from each other.

In FIG. 1 each antenna array 108, 110 comprises four antenna elements 112. Alternatively, the number of antenna elements 112 can differ. For example, the transmitting antenna array 108 can comprise four antenna elements 112 and the receiving antenna array 110 can comprise eight antenna elements 112 or vice versa.

Furthermore, the transmitter unit 104 is electrically connected to the transmitting antenna array 108 via a beamforming network 114. The receiver unit 106 is electrically connected to the receiving antenna array 110 via another beamforming network 114.

Each beamforming network 114 comprises a switching device 116 to select a desired beam. The switching device 116 is realized as a 1:4 switching device, i.e. as a one to four RF switch, commonly referred to as Single Pole, Four Throw (SP4T). Skyworks SKY13626-685LF is one non-limiting example of such RF switch.

In addition, each beamforming network 114 comprises a Butler Matrix 118, here a 4×4 Butler Matrix. More specifically, each beamforming network 114 comprises one Butler matrix 118.

The switching device 116 comprises four output ports 120*a-d*, namely beam ports, wherein the output ports 120*a-d* are electrically connected to four input ports 122*a-d* of the Butler Matrix 118. Here, one output port 120*a-d* of the switching device 116 is electrically connected to one input port 122*a-d* of the Butler Matrix 118.

The Butler Matrix 118 comprises four antenna ports 124*a-d*. One antenna port 124*a-d* is electrically connected to one antenna element 112 of the respective antenna array 108, 110. The number of antenna ports 124*a-d* optionally corresponds to the number of antenna elements 112 of the respective antenna array 108, 110.

The receiver unit 106 comprises a variable phase shifter 126, which is represented as a dotted lined square in FIG. 1.

During operation, the antenna device 100, optionally the control unit 102, generates a transmitting signal and provides the transmitting signal to the transmitter unit 104. In addition, the control unit 102 is configured to steer a radiation pattern 136 (see FIG. 3) of the transmitting antenna array 108 and/or the receiving antenna array 110.

The transmitting signal is then provided to one or more of the antenna elements 112 of the transmitting antenna array 108 via the beamforming network 114, here via the switching device 116 and the Butler Matrix 118.

The transmitting signal optionally can be called a beamforming signal. That means that the antenna device 100 is configured to perform a beamforming, optionally a passive beamforming, by using the transmitting antenna array 108 and/or the receiving antenna array 110.

A signal reflected by an RFID tag is received by one or more of the antenna elements 112 of the receiving antenna array 110. The received signal is then provided to the receiver unit 106 via the beamforming network 114, here via the Butler Matrix 118 and the switching device 116.

The receiver unit 106 transfers the received signal to the control unit 102. Based on the received signal a localization of the RFID tag can be performed.

Due to the separation and the orthogonal arrangement of the two antenna arrays 108, 110, the antenna device 100 is reduced in size while performing like a bigger antenna device 100 with more than the described number antenna elements 112.

Figure 2:
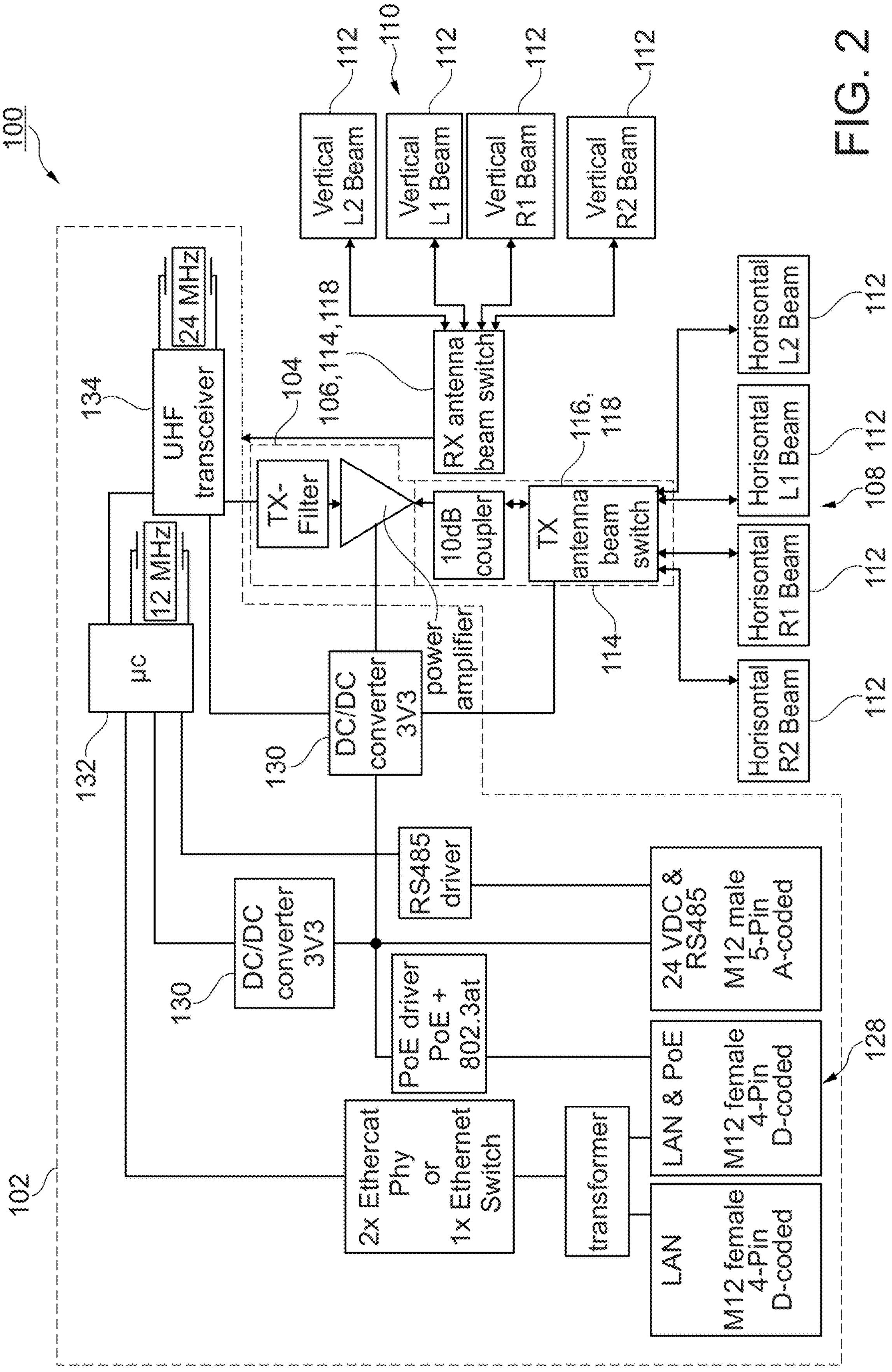
FIG. 2 shows a schematic drawing of the bistatic antenna device according to FIG. 1 showing respective components in more detail.

With reference to FIG. 2, a more detailed schematic drawing of the antenna device 100 according to the invention is shown.

The general components correspond to the components as already described regarding reference to FIG. 1.

One difference is that the horizontally arranged antenna elements 112 belong to the transmitting antenna array 108 and the vertically arranged antenna elements 112 belong to the receiving antenna array 110. However, the antenna arrays 108, 110 are also arranged orthogonally to each other.

As can be taken from FIG. 2, the control unit 102 comprises several elements like input ports 128 to receive input signals or data.

Moreover, the control unit 102 comprises converters 130, especially DC/DC converters, as well as a microcontroller 132 to feed a transceiver 134, especially a UHF transceiver.

According to the embodiment of FIG. 2, the transceiver 134 is coupled to the transmitter unit 104 as well as to the receiver unit 106.

The transmitter unit 104 also comprises a TX filter e.g. to ensure that a clear signal is provided to the transmitting antenna array 108. In this context, the beamforming network 114 additionally comprises a coupler, especially a 10 dB coupler.

According to the embodiment shown in FIG. 2, the switching device 116 and the Butler Matrix 118 of both beamforming networks 114 are optionally realized in one component. Regarding the "transmitting path", the switching device 116 and the Butler Matrix 118 are realized as an TX antenna beam switch. Regarding the "receiving path", the switching device 116 and the Butler Matrix 118 are realized as an RX antenna beam switch.

During operation and with view to the embodiment of FIG. 2, the transmitting signal is transferred from the UHF transceiver 134 to the TX filter and to the power amplifier of the transmitter unit 104. Then the transmitting signal is provided to the 10 dB coupler and to the TX antenna beam switch 116, 118. After that, the transmitting signal is transferred to one or more of the antenna elements 112 of the transmitting antenna array 108.

The reflected signal is received by one or more of the antenna elements 112 of the receiving antenna array 110 and transferred via the RX antenna beam switch 106, 114, 118 to the transceiver 134 for further processing.

Figure 3:
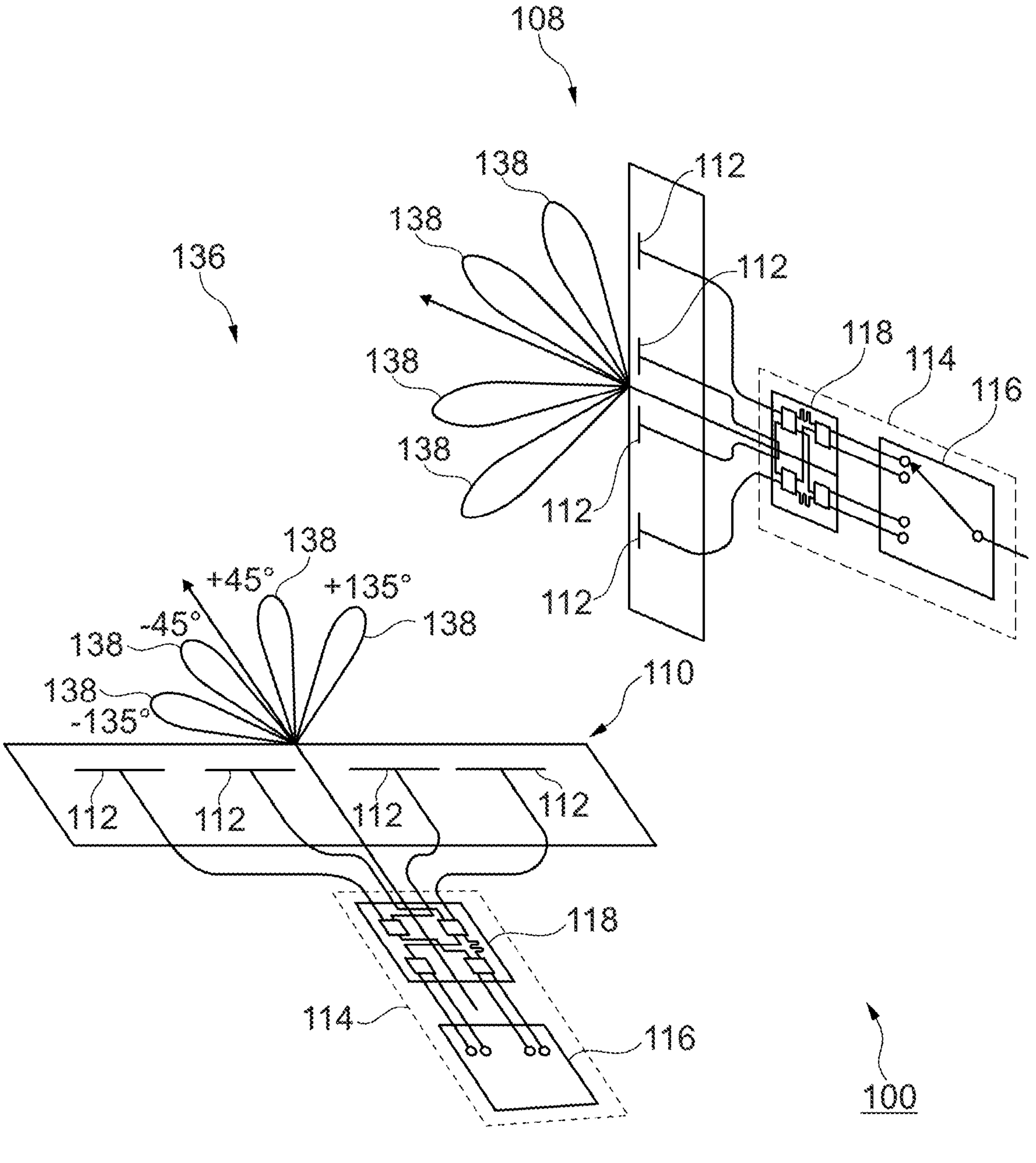
FIG. 3 shows a schematic drawing of a beamforming radiation pattern generated by the bistatic antenna device shown in FIGS. 1 and 2.

A more detailed view on the beamforming radiation pattern is explained with regard to FIG. 3.

FIG. 3 especially shows—in a perspective drawing—the orthogonally arrangement of the transmitting antenna array 108 and the receiving antenna array 110. Both antenna arrays 108, 110 also comprise—but are not limited to—four antenna elements 112.

In addition, the antenna device 100 comprises the aforementioned beamforming network 114 containing the switching device 116 and the Butler Matrix 118.

The transmitter unit 104 and the receiver unit 106 are not shown in FIG. 3 for the sake of an easier overview and to allow the focus to be directed to the beamforming aspect of the antenna arrays 108, 110.

As can be taken from FIG. 3, the antenna arrays 108, 110 are emitting a beamforming radiation pattern 136 with four beamforming clubs 138 for each antenna array 108, 110.

That means that the antenna device 100 and especially the Butler Matrix 118 allow to point the beam in four directions from the boresight of the respective antenna array 108, 110. In FIG. 3 these directions are −135°, −45°, +45° and +135°.

During operation and to localize a tag (not shown), the antenna device 100 will "hear" the strongest responses from the location where the radiation pattern 136 of the transmitting antenna array 108 and the radiation pattern 136 of the receiving antenna array 110 will intersect.

REFERENCE SYMBOLS

100 bistatic antenna device
102 control unit
104 transmitter unit
106 receiver unit
108 transmitting antenna array
110 receiving antenna array
112 antenna elements
114 beamforming network
116 switching device
118 Butler Matrix
120*a-d* output ports of the switching device
122*a-d* input ports of the Butler Matrix
124*a-d* antenna ports of the Butler Matrix
126 variable phase shifter
128 input ports of the control unit
130 converter
132 microcontroller
134 transceiver
136 radiation pattern
138 beamforming club

What is claimed is:

1. An RFID reader device for industrial applications, comprising:

a bistatic antenna device including:

a control unit;
a transmitter unit;
a receiver unit;
a transmitting antenna array; and
a receiving antenna array;

wherein the transmitting antenna array and the receiving antenna array are arranged orthogonally to each other and separate from each other;

wherein the control unit is configured to electrically steer a radiation pattern of the transmitting antenna array and/or the receiving antenna array;

wherein the transmitting antenna array is configured to emit a transmitter signal in accordance with the radiation pattern, and wherein the receiving antenna array is configured to receive a backscattered signal from an RFID tag, the backscattered signal being caused by the transmitter signal, and to provide the backscattered signal to the control unit.

2. The RFID reader device according to claim 1, wherein the control unit is configured to perform a beamforming by using the transmitting antenna array and/or the receiving antenna array.

3. The RFID reader device according to claim 2, wherein the beamforming is or includes a passive beamforming.

4. The RFID reader device according to claim 1, further comprising a first beamforming network, wherein the transmitter unit is electrically connected to the transmitting antenna array and/or to the receiving antenna array via the first beamforming network.

5. The RFID reader device according to claim 4, wherein the first beamforming network includes a first switching device configured to select a desired beam.

6. The RFID reader device according to claim 5, wherein the first beamforming network comprises a first Butler Matrix.

7. The RFID reader device according to claim 6, wherein the first Butler Matrix is provided for the transmitting antenna array, the transmitting antenna array comprising at least two antennas being electrically connected to an output of the first Butler Matrix, respectively, and being arranged orthogonal to the receiving antenna array, respectively.

8. The RFID reader device according to claim 1, wherein the receiver unit is electrically connected to the transmitting antenna array and/or to the receiving antenna array via a second beamforming network.

9. The RFID reader device-according to claim 8, wherein the second beamforming network includes a second switching device configured to select a desired beam.

10. The RFID reader device according to claim 9, wherein the second beamforming network comprises a second Butler Matrix.

11. The RFID reader device according to claim 10, wherein the second Butler Matrix is provided for the receiving antenna array, the receiving antenna array comprising at least two antennas being electrically connected to an output of the second Butler Matrix, respectively, and being arranged orthogonal to the transmitting antenna array, respectively.

12. The RFID reader device according to claim 1, wherein the transmitting antenna array and the receiving antenna array comprise a same number or a different number of antennas.

13. The RFID reader device-according to claim 1, wherein the receiver unit comprises or is at least one variable phase shifter.

14. The RFID reader device-according to claim 1, wherein the control unit is configured to steer the radiation pattern of the transmitting antenna array and the receiving antenna array separately from one another.

15. The RFID reader device according to claim 1, further comprising:

a mount for connecting the RFID reader device to a structure of a logistics site; and a main body being connected to the mount and comprising the bistatic antenna device;

wherein the transmitting antenna array is arranged as a vertical antenna array with respect to a ground of the logistics site and the receiving antenna array is arranged as a horizontal antenna array with respect to the ground of the logistics site, or the receiving antenna array is arranged as a vertical antenna array with respect to a ground of the logistics site and the transmitting antenna array is arranged as a horizontal antenna array with respect to a ground of the logistics site.

16. The RFID reader device according to claim 1, wherein the control unit is configured to localize the RFID tag based on the backscattered signal.

* * * * *